United States Patent [19]

Simon et al.

[11] Patent Number: 5,310,553
[45] Date of Patent: May 10, 1994

[54] RECHARGEABLE ELECTROCHEMICAL CELL HAVING A LIQUID ELECTROLYTE, AND A LITHIUM/CARBON ANODE

[75] Inventors: Bernard Simon, Paris; Jean-Pierre Boeuve, Marcoussis, both of France

[73] Assignee: Alcatel Alsthom Compagnie Generale D'Electricite, Paris, France

[21] Appl. No.: 889,253

[22] Filed: May 28, 1992

[30] Foreign Application Priority Data

May 31, 1991 [FR] France ................. 91 06590

[51] Int. Cl.$^5$ ............................. H01M 4/60
[52] U.S. Cl. ..................... 429/212; 429/194; 429/197; 429/218
[58] Field of Search ........... 429/194, 197, 218, 212

[56] References Cited

U.S. PATENT DOCUMENTS

| | | | |
|---|---|---|---|
| 4,615,959 | 10/1986 | Hayashi et al. | 429/194 |
| 4,957,833 | 9/1990 | Daifuku et al. | 429/197 |
| 5,028,500 | 7/1991 | Fong et al. | 429/194 |
| 5,153,082 | 10/1992 | Ogino et al. | 429/194 |

FOREIGN PATENT DOCUMENTS 9013924 11/1990 Canada .
0328131 8/1989 European Pat. Off. .
0404578 12/1990 European Pat. Off. .
0409192 1/1991 European Pat. Off. .

OTHER PUBLICATIONS

Chemical Abstracts, vol. 110, No. 12, 1988, Columbus, Ohio, US; abstract No. 98831J, Yuichi Sato et al.: "Secondary Nonaqueous Battery with Lithium-Inserting Carbon Cathodes".

Chemical Abstracts, vol. 110, No. 8, 1988, Columbus, Ohio, US; abstract No. 61098Z, Hideaki Tanaka: "Electrodes for Secondary Battery".

*Primary Examiner*—Prince Willis, Jr.
*Assistant Examiner*—M. Nuzzolillo
*Attorney, Agent, or Firm*—Sughrue, Mion, Zinn, Macpeak & Seas

[57] ABSTRACT

A rechargeable electrochemical cell comprising a cathode, a liquid electrolyte with a solute and at least one solvent, an anode containing a highly crystallized carbon-containing material capable of intercalating lithium ions, said electrochemical cell being characterized by the fact that the surface of said carbon-containing material is provided with a thin layer which is impermeable to said electrolyte solvent, but which allows lithium to be diffused.

17 Claims, No Drawings

RECHARGEABLE ELECTROCHEMICAL CELL HAVING A LIQUID ELECTROLYTE, AND A LITHIUM/CARBON ANODE

The present invention relates to a rechargeable electrochemical cell having a liquid electrolyte and a lithium/carbon anode.

Despite offering significant advantages over nickel cadmium storage cells (high energy density, low self-discharge, and low toxicity), electrochemical cells having a lithium anode currently have a limited life-span in terms of cycles which must be improved if this type of product is to be developed more widely.

Because of the extremely reductive nature of lithium, a passivating conductive layer of ions is formed on the anode by the lithium reacting with the electrolyte. During recharging, the deposit of lithium ions in metallic form is dendritic in nature, and this is the main source of the following faults that have been observed:

Appearance of short-circuits due to dendrite growth; such short-circuits can cause the lithium to melt and the component to be destroyed. Increased reactivity of the electrolyte due to the specific surface area of the deposited dendritic lithium.

Cycling efficiency is significantly affected.

Several ways of solving this problem have already been considered.

Since the quality of the lithium deposit depends largely on the properties of the passivation layer formed with the electrolyte, attempts have been made to improve the reversibility of the electrode by using specific solvents with stringent purity criteria, or by exerting pressure on the anode.

It has also been proposed to replace metallic lithium with compounds enabling lithium to be intercalated by reduction at potentials close to the potential of metallic lithium. The presence of a receiving matrix should then enable the phenomenon of dendritic growth to be avoided. To this end, experiments have been performed with intermetallic alloys of lithium LiAl, LiSi, etc., or certain transition metal oxides $WO_2$, $Nb_2O_5$. Much research has also gone into carbon-containing materials capable of intercalating lithium ions between their graphite planes, with a view to achieving good stability for the electrode, and a large maximum theoretical capacity for the $LiC_6$ anode, as indicated in the Article by D. Guérard and A. Herold published in Carbon 13, 1975, p. 337.

European Patent Application EP-A-0 357 001 proposes such a carbon-containing material, but it would appear that its insertion kinetics are too slow and enable a charging current density of only 0.5 mA/cm$^2$ to be achieved.

It would also appear from publications that among the many carbon-containing materials in existence, the most suitable from the points of view of both thermodynamics and intercalation kinetics are those which offer the greatest degree of crystallinity. It is recalled that the degree of crystallinity or degree of graphitization dg of a carbon-containing material is defined on the basis of the distance between the graphite planes, which distance is 3.354 Å for a nearly-perfect graphite crystal:

$$dg = (3.44 - d_{002})/0.086$$

where $d_{002}$ is the distance between graphite planes, which distance is measured by conventional X-ray spectroscopy means.

In the literature, and in particular in the piece by A. Herold, Material Science and Engineering, 31, 1977, 1, it would appear that the presence of structural faults increases the value of the intercalation potential relative to the potential of lithium and limits the mobility of ions in the structure.

This leads to the use of natural graphite, artificial graphite, and certain "graphite" fibers that have been treated at high temperatures. All these materials have high degrees of crystallinity (dg greater than 0.8) and large crystal sizes. However, when using a carbon-containing material having a high degree of crystallinity, the following phenomena are observed:

there is exfoliation of the carbon-containing material, and this leads to the appearance of irreversible capacity; and the maximum theoretical capacity is difficult to achieve.

An aim of the present invention is to provide an electrochemical cell having a lithium/carbon anode which offers higher performance than prior anodes.

The present invention provides a rechargeable electrochemical cell comprising a cathode, a liquid electrolyte with a solute and at least one solvent, an anode containing a highly crystallized carbon-containing material with a degree of crystallinity dg greater than 0.8 and capable of intercalating lithium ions, said electrochemical cell being characterized by the fact that said carbon-containing material is made up of single-phase grains, the surface of each grain being provided with a thin layer which is impermeable to said electrolyte solvent, but which allows lithium to be diffused, the impermeability being either intrinsic, or caused by passivation of said layer as a result of the reactivity of said electrolyte.

The thin layer prevents any intercalation of the solvent molecules responsible for exfoliation of the anode and the appearance of irreversible processes. Lithium intercalation kinetics are limited only in the thickness of the layer, and are therefore virtually not reduced compared with the kinetics of the highly crystallized carbon-containing material.

In a first embodiment, said thin layer is made of carbon that is more random than said carbon-containing material, and said thin layer becomes impermeable to the solvent by passivation due to the reactivity of the electrolyte prior to mass intercalation of lithium.

Said carbon-containing material of said thin layer has a dg of less than 0.8.

Such a layer may be made by vapor-phase deposition of hydrocarbon, by plasma or thermal decomposition, or by carbonization of a layer of polymer, such as a polyacrylonitrile.

In another embodiment, said thin layer is made of a metal or a metalloid constituting an intermetallic alloy with lithium at ambient temperature. For example, the metal or metalloid may be aluminum or silicon. The layer is then intrinsically impermeable to the solvent.

In another embodiment, said thin layer is made of an electron-conducting polymer which can be doped with the cation Li$^+$, such as, for example, polyacetylene.

In another embodiment, said thin layer is made of a low potential lithium intercalation compound, e.g. $WO_2$ deposited by CVD.

The electrolyte solute in the cell of the invention is chosen from the usual solutes, with an anion being chosen, for example, from $ClO_4^-$, $AsF_6^-$, $BF_4^-$, $PF_6^-$, $CF_3SO_3^-$, $B(C_6H_5)_4^-$, and $(CF_3SO_2)_2N^-$.

The solvent must have conductivity and wetting power that are sufficient to enable cell performance levels to be optimized. The solvent is chosen inter alia from propylene carbonate, ethylene carbonate, g-butyrolactone, tetrahydrofuran, 2-methyl tetrahydrofuran, sulfolane, dimethylsulfite, dimethylsulfoxide, 1–2 dimethoxyethane, dimethylcarbonate, diethylcarbonate and mixtures thereof.

The cathode of said cell may be based on a material selected from lithium intercalation compounds, such as oxides of vanadium, chromium, cobalt, and manganese, and from lithium doped electron-conducting polymers (polypyrrol and polyaniline).

In a particularly advantageous embodiment, said cathode contains a highly crystallized carbon-containing material capable of intercalating anions $X^-$ in the proportion $XC_8$, with X being chosen from $AsF_6$, $PF_6$, $BF_4$, and $ClO_4$, the surface of said material being provided with a thin layer impermeable to said solvent.

As was the case for said anode, said thin layer may be made of carbon which is more random than said carbon-containing material.

The thin layer may also be made of a conductive polymer which can be doped with said anions, said polymer being chosen, for example, from polyaniline, polyacetylene and polypyrrol.

Such a cathode offers the advantage of being less expensive than the above-mentioned oxides, and non-toxic for the environment during manufacture of the cell, and after use thereof.

Such a cell has a high voltage, i.e. greater than 4 volts.

Other characteristics and advantages of the present invention will appear on reading the following description of embodiments given by way of non-limiting example.

EXAMPLE 1

The cell of the invention was made up of three main components: an anode, an electrolyte, and a cathode.

The anode was made as follows:

Natural graphite in powder form having a grain size of 50 μm, and having a dg of greater than 0.8 was mixed with a solution of polyacrylonitrile in dimethylformamide (5 g/l). By evaporating the solvent, a deposit of polyacrylonitrile formed around the grains of graphite. The thickness of the deposit was of the order of 1 μm. The deposit was carbonized in nitrogen by heat treatment at 1,200° C. This resulted in grains of graphite constituted by crystallites of the same phase, the surface of each grain being provided with a layer of carbon that was more random than graphite.

The electrode was manufactured by mixing the resulting modified graphite with a solution of polyvinylidene fluoride (PVDF) in dimethylformamide (10 g/l) to obtain a paste made up of graphite and PVDF in proportions by weight of 90 to 10, which paste was pressed onto an expanded nickel collector.

The electrolyte was constituted by a 1M solution of $LiAsF_6$ in a mixture of propylene carbonate, ethylene carbonate and 1–2 dimethoxyethane (PC/EC/2DME).

The cathode was constituted by a mixture of $LiCoO_2$, Teflon, carbon black, and graphite, which mixture was pressed onto an expanded titanium collector.

Such a cell is limited by the capacity of the anode, and may be assembled in air without taking any specific precautions. The cell has a cycling capacity of 250 mAh per gram of graphite, for a current density of 1 mA/cm², and for values for potential lying in the range 4.2V to 3V.

EXAMPLE 2

The cathode of the cell in this example was based on graphite which had been surface-modified by carbonizing polyacrylonitrile, as described in Example 1.

The electrode plasticized by Teflon (graphite 90%, Teflon 10% by weight) was obtained by mixing the graphite powder, a Teflon latex, and ethanol, and then pressing the resulting paste onto an expanded titanium collector.

The anode of the cell was based on natural graphite which had been surface-modified by a layer of aluminum.

The non-modified electrode was obtained like the anode in Example 1, with the plasticizer PVDF. The modification in the electroactive surface was obtained by electrodeposition of aluminum by using a solution of $LiAlH_4$ in diethylether.

The electrolyte was a 1M solution of $LiAsF_6$ in a mixture of propylene carbonate, ethylene carbonate and dimethylcarbonate (PC/EC/DMC).

The cell was assembled in air, in the discharged state.

Naturally, the invention is not limited to the above-described embodiments. Any means may be replaced with equivalent means without going beyond the ambit of the invention.

In the claims:

1. A rechargeable electrochemical cell comprising a cathode, a liquid electrolyte with a solute and at least one solvent, and an anode containing a highly crystallized carbon-containing material with a degree of crystallinity dg greater than 0.8 and capable of intercalating lithium ions, wherein said carbon-containing anode material is made up of single-phase grains, the surface of each grain being provided with a thin layer which is impermeable to said electrolyte solvent, but which allows lithium to be diffused, the impermeability being either intrinsic, or caused by passivation of said layer as a result of the reactivity of said electrolyte, said thin layer of the anode material having a composition different from that of said carbon-containing material, and where the degree of crystallinity dg of the carbon-containing material is defined as $$dg = (3.44 - d_{002})/0.086$$

where $d_{002}$ is the distance between graphite planes, which distance is measured by X-ray spectroscopy.

2. An electrochemical cell according to claim 1, wherein said thin layer of the anode material is made of carbon that is more random than said carbon-containing material.

3. An electrochemical cell according to claim 1, wherein said thin layer of the anode material is made of a metal or a metalloid constituting an intermetallic alloy with lithium at ambient temperature.

4. An electrochemical cell according to claim 1, wherein said thin layer of the anode material is made of a an electron-conducting polymer which can be doped with the cation $Li^+$.

5. An electrochemical cell according to claim 4, wherein said thin layer of the anode material is made of polyacetylene.

6. An electrochemical cell according to claim 1, wherein said thin layer of the anode material is made of a low potential lithium intercalation compound.

7. An electrochemical cell according to claim 6, wherein said intercalation compound is $WO_2$.

8. An electrochemical cell according to claim 1, wherein said cathode contains a highly crystallized carbon-containing material capable of intercalation anions $X^-$ in the proportion $XC_8$, with X selected from the group consisting of $AsF_6$, $PF_6$, $BF_4$ and $ClO_4$, the surface of said cathode material being provided with a thin layer impermeable to said solvent.

9. An electrochemical cell according to claim 8, wherein said thin layer of the anode material is made of carbon which is more random than said highly crystallized carbon-containing material.

10. An electrochemical cell according to claim 8, wherein said thin layer of the cathode material is made of a conductive polymer which can be doped with said anions.

11. An electrochemical cell according to claim 10, wherein said conductive polymer is selected from the group consisting of polyaniline, polyacetylene and polypyrrol.

12. An electrochemical cell according to claim 1, wherein said cathode is made of a lithium intercalation compound selected from the group consisting of oxides of vanadium, chromium, cobalt, and manganese, and from lithium doped electron-conducting polymers.

13. An electrochemical cell according to claim 1, wherein said electrolyte solute comprises an anion selected from the group consisting of $ClO_4$, $AsF_6$, $BF_4$, $PF_6$, $CF_3SO_3$ and $B(C_6H_5)_4$.

14. An electrochemical cell according to claim 1, wherein said electrolyte solvent is selected from the group consisting of propylene carbonate, ethylene carbonate, g-butyrolactone, tetrahydrofuran, 2-methyl tetrahydrofuran, sulfolane, dimethylsulfite, dimethylsulfoxide, 1-2 dimethoxyethane, dimethylcarbonate, diethylcarbonate and mixtures thereof.

15. An electrochemical cell according to claim 1, wherein said thin layer of the anode material is made of carbon having a dg of less than 0.8.

16. An electrochemical cell according to claim 12, wherein said lithium doped electron-conducting polymers are selected from the group consisting of lithium doped polyaniline and lithium doped polypyrrol.

17. An electrochemical cell according to claim 1, wherein said thin layer of the anode material is made of a material selected from the group consisting of carbon having a dg of less than 0.8, a metal or a metalloid constituting an intermetallic alloy with lithium at ambient temperature, an electron-conducting polymer which can be doped with the cation $Li^+$, polyacetylene and a low potential lithium intercalation compound.

* * * * *